United States Patent [19]

Shenoy et al.

[11] Patent Number: 4,677,827
[45] Date of Patent: Jul. 7, 1987

[54] NATURAL GAS DEPRESSURIZATION POWER RECOVERY AND REHEAT

[75] Inventors: Thirthahalli A. Shenoy, Whitehall; John C. Tao, Perkiomenville, both of Pa.

[73] Assignee: Air Products and Chemicals, Inc., Allentown, Pa.

[21] Appl. No.: 704,679

[22] Filed: Feb. 22, 1985

[51] Int. Cl.[4] ..................... F01K 23/04; F01K 25/06
[52] U.S. Cl. .................................................. 60/648
[58] Field of Search ......................................... 60/648

[56] References Cited

U.S. PATENT DOCUMENTS 3,360,944  1/1968  Knapp et al.
4,400,947  8/1983  Ruhemann

OTHER PUBLICATIONS

"Largest Expander Cycle LNG Plant Now in Operation", by Irving Weiss and Steven J. Markbreiter-Cryogenic Engineering News, Mar. 1969, pp. 24,25,40,44.

Primary Examiner—Allen M. Ostrager
Attorney, Agent, or Firm—Geoffrey L. Chase; J. C. Simmons; E. E. Innis

[57] ABSTRACT

A process is described for the recovery of net power during the depressurization of natural gas from high pressure pipeline conditions to low pressure end user conditions wherein the natural gas is rewarmed to a relatively warm temperature greater than 35° F. using renewable energy and ambient atmosphere.

13 Claims, 1 Drawing Figure

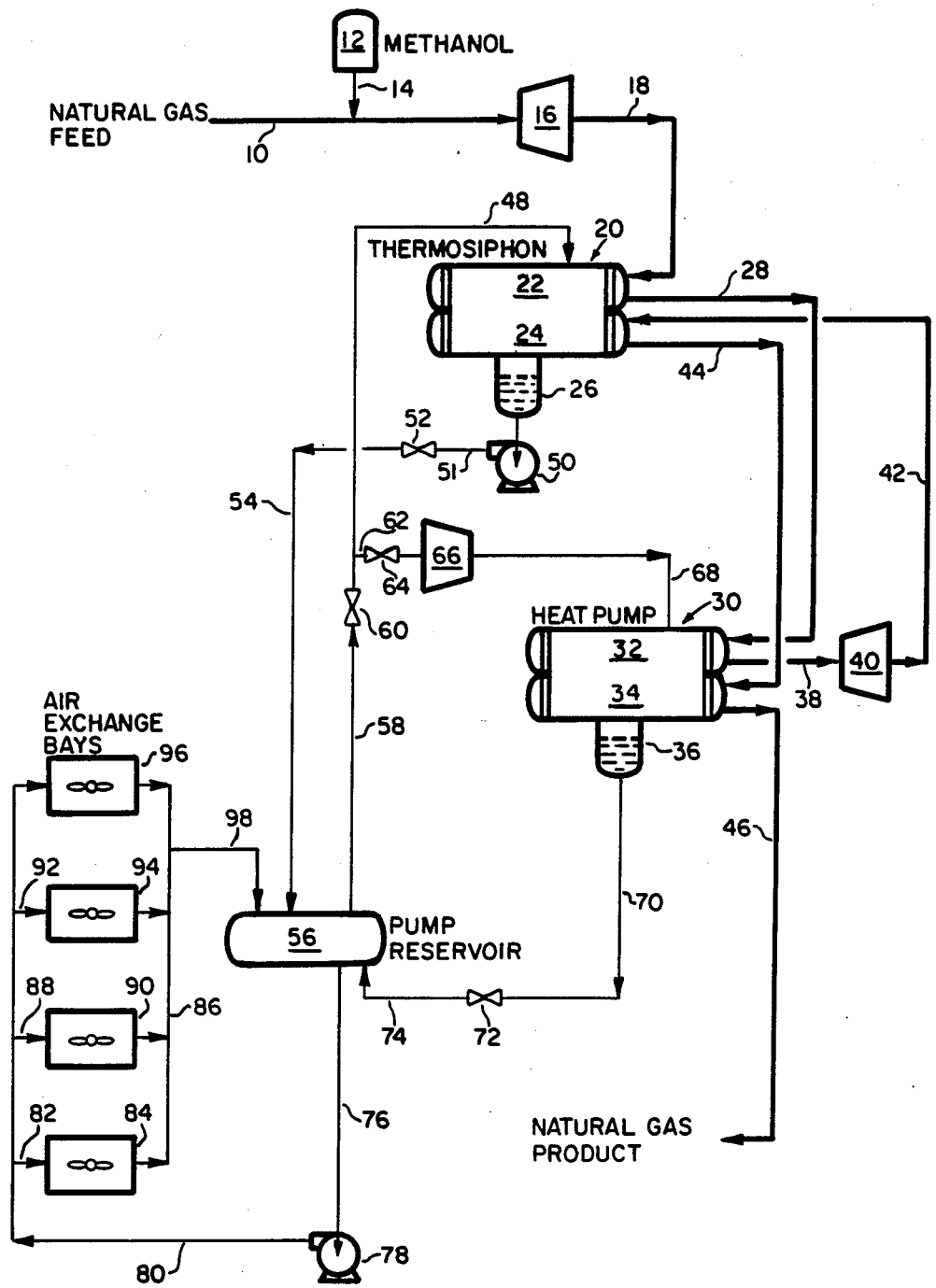

4,677,827

NATURAL GAS DEPRESSURIZATION POWER RECOVERY AND REHEAT

TECHNICAL FIELD

The present invention is directed to the field of power recovery in the depressurization of high pressure gas to a low pressure gas, typically for an end user. More specifically, the present invention is related to depressurizing pipeline natural gas to low pressure for an end user wherein net power is recovered and low pressure natural gas is reheated economically to relatively warm temperature conditions.

BACKGROUND OF THE PRIOR ART

Various techniques for depressurizing high pressure gas streams from transport mode to end user mode are known in the prior art. In some instances, high pressure gas is merely throttled through a Joule-Thompson valve to reduce its pressure without the recovery of the energy of compression. This results in a low pressure relatively cold product stream wherein no energy recovery is accomplished. It has also been known to depressurize high pressure gases for low pressure end use by expanding high pressure gas through a work turbine or a Joule-Thompson valve with the subsequent reheat of the cooled low pressure gas product by various non-renewable energy sources. These energy sources include a portion of the high pressure gas, in the instance of combustible gas such as natural gas, or other fuel sources readily available at the site of depressurization, such as coal or fuel oil. In some instances, rewarming mediums are readily available if the depressurization site is near large quantities of warm water, such as sea water, or the site is adjacent other industrial plants wherein waste heat in the form of steam is available. In those latter instances, reheat of the cooled depressurized gas stream is performed against such available warmer temperature mediums which allow the depressurized gas to be maintained at relatively warm temperature conditions.

Rewarming of depressurized gases is typically necessary in order to avoid problems arising from low temperature conditions which would otherwise result from depressurized gas. The problem is particularly acute wherein energy recovery from the depressurization stage is desired. Where energy recovery is not desired and high pressure gas is expanded through a Joule-Thompson Valve without partial condensation, a relatively small cooling effect is accomplished and such colder temperatures are not detrimental to eventual end use of the depressurized gas. However, where energy recovery is desired and high efficiency of energy recovery is achieved, the depressurized gas typically attains very low output temperatures from the expansion means, such as a turbo expander. These low temperature conditions, wherein energy is efficiently recovered in the depressurization, result in undesirable temperature-induced conditions downstream of the depressurization, including; frosting of the conveyance equipment, equipment materials problems from the stress of low temperatures, condensables, hydrate and ice formation in the gas and safety hazards with regard to extremely low temperature conditions being present near operating personnel.

In recent years, governmental regulations have encouraged the use of renewable energy sources for various industrial processes through tax incentives and other incentives. With regard to power recovery systems which require classification as small power plants, government regulation has required that only 25% of the total available energy utilized in such small power plant may come from non-renewable energy sources. Such requirements are particularly pertinent to power plants operating to recover power from natural gas being depressurized from pipeline pressures to end user pressures, wherein the reheating necessary to return the depressurized natural gas to relatively warm temperatures has traditionally been performed by utilizing a portion of the natural gas fired in a natural gas burner. Such a reheat mode would not comply with present-day government standards for classification as a small power plant.

Various systems are known for recovering power from natural gas including U.S. Pat. No. 4,400,947 which utilizes rewarming liquefied natural gas to liquefy a refrigerant which is pumped to high pressure before being expanded with power recovery to low pressure for reliquefaction. The natural gas is at low pressure at all times in that facility.

It is also known to expand natural gas to low pressure for end use in an expansion turbine wherein the power is utilized to compress already high pressure natural gas to further elevated pressures necessary to liquefy a slipstream of the natural gas for storage during off-peak natural gas consumption time periods, while achieving the depressurization of natural gas for present consumption. Such a process is shown in an article "Largest Expander Cycle LNG Plant Now In Operation" by Irving Weiss and Steven J. Markbreiter appearing in Cryogenic Engineering News, March 1969, pages 24, 25, 40 and 44. This type of plant is called a peak-shaving plant, wherein at low consumption times, such as summer time, natural gas is depressurized and the cold temperatures resulting from depressurization are utilized to liquefy a portion of the natural gas for storage and later use during high consumption times, such as winter time. In such a cycle, the low pressure natural gas is rewarmed against liquefying natural gas slipstream, and the heat of compression of the feed natural gas is recovered in the rewarming natural gas for distribution. Such a cycle is shown in U.S. Pat. No. 3,360,944.

Both of these prior art cycles are involved in supply-end power recoveries and reheat provisions, rather then end user-located depressurizations and reheating circumstances. The present invention constitutes an improved method for depressurizing high pressure pipeline natural gas to low pressure end user conditions, wherein the low pressure gas is maintained at a relatively warm temperature by reheating with renewable energy and the energy of depressurization under conditions so efficient that net power is recovered. Contrary to the drawbacks of prior art systems which require an available heat source such as waste, industrial heat or sea water, the present invention may be utilized at remote sites where no readily available heat source is convenient or at sites where waste heat utilization is uneconomical.

BRIEF SUMMARY OF THE INVENTION

The present invention is directed to a process for reduction in pressure of natural gas with the recovery of net power and the control of the temperature of the low pressure natural gas product by heat exchange with an ambient atmosphere. comprising the steps of introducing high pressure natural gas at a pressure in the range of 100 to 2000 psia into an expansion turbine, expanding the natural gas to a low pressure in the range of 40 to 100 psia and to a resulting low temperature in the expansion turbine and recovering power from said turbine, rewarming the low pressure, low temperature natural gas in at least two stages by heat exchange with an ambient atmosphere comprising indirect heat exchange of said natural gas with a refrigerant in a thermosiphon cycle which indirectly heat exchanges with said ambient atmosphere and indirect heat exchange of the natural gas from said thermosiphon cycle with a refrigerant in a heat pump cycle which indirectly heat exchanges with said ambient atmosphere and recovering the natural gas at a low pressure and at a temperature greater than 35° F.

Preferably the reduction in pressure and the rewarming are performed in two stages wherein the natural gas is expanded to a first lower pressure and lower temperature and is then rewarmed in a thermosiphon and a heat pump cycle before being further expanded to a lowest pressure and a low temperature before finally being rewarmed in the same thermosiphon and heat pump cycle to an end pressure and temperature acceptable for traditional natural gas end uses.

Preferably the power recovered by depressurizing the natural gas through an expansion turbine is utilized in part to provide all of the power requirements of the thermosiphon and heat pump rewarming cycles other than the heat derived from the ambient atmosphere.

Optimally, the refrigerant utilized in both the thermosiphon cycle and the heat pump cycle is heat exchanged with the low pressure, low temperature natural gas so that the vaporous refrigerant is at least partially condensed against natural gas and liquid refrigerant is then heat exchanged with ambient atmosphere to revaporize the liquefied refrigerant.

Preferably, the gas is rewarmed to a relatively warm temperature in the range of 35°-45° F.

Optimally the high pressure natural gas is at a pressure of 200 to 600 psia and is reduced to a pressure in the range of 80 to 100 psia and a temperature of approximately 40° F.

Preferably, the power consumption of the rewarming thermosiphon and heat pump stages utilizes only 5 to 15% of the power produced in the expansion turbine depressurization of the natural gas, optimally approximately 10%.

DETAILED DESCRIPTION OF THE DRAWING

The drawing shows a schematic representation of the preferred embodiment of the present invention wherein natural gas is depressurized and rewarmed in two stages.

DETAILED DESCRIPTION OF THE INVENTION

As set forth earlier, there is a need to depressurize gas streams, such as pipeline pressure natural gas, for end use consumption. End users of pipelined natural gas typically do not want natural gas at the high pressures necessary for long distance pipeline transmission. This is true of industrial end users, as well as distribution points for retail consumption. Under the energy conscious mood of the present day utilization of all fuel sources including natural gas, it is desirable to recover any utilizable energy when possible in the transmission and ultimate consumption of fuels. Therefore, it is appropriate in utilizing high pressure gas, such as natural gas at 100-2000 psia and 40°-60° F., to depressurize the gas with the recovery of power in order to use the gas under the most efficient conditions. A problem arises in depressurizing a high pressure gas in an energy efficient manner. This problem comprises the fact that turbo expansion, an energy efficient depressurization method, results in very cold effluent temperatures of the depressurized gas. Low temperatures present problems of frosting, condensables occurring in the gas stream, hydrate and ice formation, equipment materials selection and end user compatibility. Therefore, to recover power from depressurization in an efficient manner, it is also necessary to reheat the depressurized gas to be compatible with end user demands and avoid the problems of frosting, condensables and equipment materials selection. Recent guidelines from the Federal Energy Regulatory Commission require that for classification as small power plants, which includes depressurization energy recovery plants, such plants utilize no more then 25% of non-renewable fuel sources to complete the process goals. Therefore, the extensive use of fossil fuels or the natural gas itself in the case of depressurizing natural gas is incompatible with present governmental regulations and guidelines. Although circumstances exist wherein waste heat or large quantities of relatively warm sea water are available to provide reheat after energy efficient depressurization, certain situations still exist wherein depressurization under an energy efficient, power producing condition are desirable and yet no readily apparent reheat options are available. The present invention meets these particular needs.

In the expansion of pressurized natural gas through turbo expanders or expansion turbines for the extraction of work and recovery of power, significant temperature drops of the natural gas result. For example, natural gas entering a turbo expander at 50° F. and 450 psia will leave the expander at approximately −30° F. if expanded to a lower pressure of 200 psia and at about −85° F. if expanded to a still lower pressure of 100 psia, assuming general turbine efficiencies. To transport expanded low pressure natural gas to an end user at these temperatures would be unacceptable. Generally the gas has to be at a temperature of at least 35° F. before end use transmission preferably 35°-45° F., optimally approximately 40° F. The problem of reheating natural gas to approximately 40° F. temperatures from the potential −30° F. or −85° F. expander effluent condition is complicated by two important considerations. The first consideration is the Federal Energy Regulatory Commission guideline that small power plants must not utilize more than 25% of non-renewable energy for the total energy necessary for the system which includes renewable and non-renewable energy input. In addition, the energy input for reheating the natural gas must be minimal or the economics of recovering the power of depressurization will be lost. Power recovery in depressurizing natural gas is only attractive if the recovery equipment is not expensive or complex and the power necessary for rewarming the depressurized natural gas is such that a net power recovery can be achieved and used to pay the capital costs of the power recovery and reheat equipment. These conditions put tight constraints on any process and/or apparatus designed to recover power from depressurizing natural gas and reheating the cold, low pressure gas to relatively warm temperature conditions. Combusting any sizeable portion of the natural gas being expanded would violate the Federal Energy Regulatory Commission guidelines and would be uneconomical, due to the high value of the natural gas that would be combusted.

In the present invention, natural gas is expanded through an expansion turbine and the low pressure, low temperature natural gas effluent is rewarmed in a combination thermosiphon and heat pump cycle, wherein the power necessary to drive the thermosiphon and the heat pump is derived from electric power produced from the expansion turbine during depressurization of the natural gas. In the present invention, such power required for the thermosiphon and heat pump cycles constitutes only 5 to 15% of the power produced in the expansion turbine for depressurizing the natural gas. Therefore, energy efficient depressurization of the natural gas is achieved with a net power recovery, while utilizing renewable energy and the waste energy of the high pressure feed gas to reheat the effluent natural gas to relatively warm temperature conditions of greater than 35° F., preferably 35° F. to 45° F., optimally approximately 40° F. After expansion through the expansion turbine, the natural gas is heat exchanged with refrigerant in the thermosiphon to minimize or eliminate the problem of frosting, which would occur if the natural gas were directly heat exchanged with ambient air. Much of the heat transferred to the rewarming natural gas is derived from the refrigerant changing from a vapor phase to a liquid phase material and giving up its heat of vaporization to the natural gas. As a result, the refrigerant is then heat exchanged with ambient air or atmosphere and frosting of heat exchangers due to the moisture in the air is minimized or eliminated. The refrigerant utilized in the heat pump cycle downstream of the thermosiphon in the rewarming or reheat system of the present invention also accomplishes a phase change from vapor phase refrigerant providing heat for the rewarming natural gas to a liquid phase refrigerant which is subsequently partially revaporized in an expansion valve for recompression.

The thermosiphon is extremely efficient and highly desirable at high ambient conditions, such as warmer climates and during the summer months. The thermosiphon requires only sufficient power to pump liquid from the various heat exchange stations, such as the exchange with natural gas and the exchange with ambient atmosphere. Appropriate natural circulation can be achieved to some extent due to the natural circulation induced in a thermosiphon, wherein warmer less-dense refrigerant cycles upwardly while colder more-dense refrigerant cycles downwardly in a natural circulation. Such natural circulation can be utilized, although in an industrial setting the dependability of liquid pumping is probably desirable.

On the other hand when ambient conditions are less desirable and particularly colder such as in more polar regions or during winter months, the efficient heat production of a heat pump is desirable in the rewarming or reheat stage of the present invention. In the heat pump, ambient atmosphere rewarmed refrigerant is compressed to a pressure sufficiently high to liquefy the refrigerant when heat exchanged against the rewarming cold natural gas. The condensation transfers heat to the natural gas by again giving up the refrigerant's heat of vaporization to the rewarming natural gas. Liquid refrigerant is then returned at high pressure and partially vaporized through a Joule-Thompson valve before a portion of the vapor is returned for recompression in the heat pump compressor. The liquid portion of the refrigerant is also exchanged with an ambient atmosphere or air to provide heat energy input from the ambient conditions. Such heat input is enhanced by the recompression of the refrigerant so that additional heat is available beyond ambient conditions to insure appropriate reheating of the natural gas under all circumstances. The heat pump compressor is powered from the natural gas depressurization.

The use of a paired thermosiphon and heat pump for rewarming natural gas after turbo expansion allows the most efficient utilization of reheat sources from ambient conditions. During warm ambient conditions, the thermosiphon will be utilized predominantly for natural gas reheat, while under colder conditions, the heat pump will constitute the predominant heat source for reheat or rewarming of natural gas. Particularly, at conditions of approximately 50° F. and above the thermosiphon section will predominate the heat load and potentially may become the sole reheat source under particularly high temperature ambients. At extremely low ambient conditions, such as 0° F. and colder, the heat pump section will predominate, but will not be utilized singularly unless a temperature difference of greater then 15° F. between the natural gas and the average ambient temperature does not exist. For example, if the ambient air temperature was 0° F. and the turbine exhaust from natural gas expansion was at −10° F. the use of a thermosiphon would not be feasible. However if the turbine exhaust was −20° F. or lower the use of the thermosiphon section would still be viable, despite the low temperatures involved.

The present invention will now be described in greater detail with reference to the drawing. Natural gas at approximately 450° psia and 50° F. is introduced in line 10 and is blended with methanol from vessel 12 introduced in line 14. The methanol is used as an antifreeze agent which prevents ice and hydrate formation in the ensuing expansion. The natural gas-methanol mixture is expanded through a first stage expansion turbine 16 and is removed in line 18 at approximately 200 psia and −30° F. The natural gas at a first intermediate low pressure and temperature is then rewarmed by indirect heat exchange in a thermosiphon heat exchanger 20 specifically in a first tube bundle 22 wherein natural gas is rewarmed against condensing refrigerant such as any of the known fluorocarbons, alcohols or even lower order hydrocarbons and natural gas mixtures. The natural gas is rewarmed to potentially 15° below the particular ambient atmosphere conditions which in this case is a rewarming temperature of 35° F. with an ambient atmosphere of 50° F.

The natural gas in line 28 is then introduced into a heat pump heat exchanger 30 wherein the natural gas indirectly heat exchanges with the heat pump refrigerant in a tube bundle 32 wherein it is reheated to approximately 40° F. in line 38 before being subjected to a second and final stage of expansion in expansion turbine 40. The natural gas is expanded from 200 psia and 40° F. to 100 psia and −20° F. wherein the natural gas in line 42 is again directed to the thermosiphon heat exchanger 20. The natural gas enters the second tube bundle 24 of the thermosiphon cycle wherein the gas is reheated to 35° F. again against condensing refrigerant in the thermosiphon cycle. The natural gas in line 44 is then introduced into the second tube bundle 34 of the heat pump heat exchanger 30 for indirect heat exchange with the refrigerant of the heat pump cycle before being removed in line 46 at 100 psia and 40° F. under appropriate end user conditions as product natural gas. Expansion turbine 16 and 40 may be appropriately connected to any power recovery device, although most appropriately the turbines would be connected to an electric generator which would produce net electric power as well as the power to run the thermosiphon cycle and the heat pump cycle. Such equipment is not shown, but is deemed to be well known in the art.

The thermosiphon cycle is operated by delivering vapor phase refrigerant in line 48 to the thermosiphon heat exchanger 20 wherein the refrigerant passes over tubing bundle 22 and 24 on the shell side of the tube and shell exchanger wherein the refrigerant is condensed and gives up its heat of vaporization to the rewarming natural gas. The liquid refrigerant settles into sump 26 of the heat exchanger 20 and is conveyed through pump 50 for recycle through line 51 and control valve 52 which maintains appropriate pressure in the line. The refrigerant, passing through line 54, is returned to a pump reservoir 56 where all refrigerant is blended and only liquid refrigerant continues in line 76 to pump 78 for distribution from line 80 to one or more ambient atmosphere air exchange bays 84, 90, 94, and 96 supplied through line 80, 82, 88 and 92. In this manner, liquid refrigerant is exchanged in an indirect heat exchange manner with ambient atmosphere which rewarms and vaporizes the liquid refrigerant before returning the same in line 86 and 98 to the pump reservoir 56. Vapor refrigerant is returned from pump reservoir 56 through line 58 and valve 60 to line 48 which feeds the thermosiphon heat exchange apparatus 20.

The second stage of rewarming is performed by a heat pump cycle wherein the same refrigerant in line 48 is partially diverted in line 62 and control valve 64 through a heat pump compressor 66 which compresses the refrigerant in line 68 to a pressure high enough to condense the refrigerant at the temperatures achieved in indirect heat exchange with the rewarming natural gas in the heat pump heat exchanger 30. High pressure vaporous refrigerant descends over the tube bundles 32 and 34 of the heat exchanger 30 on the shell side of the shell and tube heat exchanger wherein the refrigerant is condensed and gives up its heat of vaporization to the rewarming natural gas. The liquid refrigerant is collected in a sump 36 and returned in line 70 and a Joule-Thompson expansion valve 72 wherein partially revaporized refrigerant in line 74 is reintroduced into the pump reservoir 56. The commingled refrigerant is divided into a vapor phase which is removed in line 58 and the liquid phase which is removed in line 76, both of which cycles have been previously discussed.

The use of refrigerant for heat exchange between the natural gas that is rewarming and the ambient atmosphere that is giving up heat energy is important to avoid frosting problems that would occur at certain ambient temperature and humidity conditions if direct rewarming of natural gas with air were performed. If very cold depressurized natural gas were heat exchanged with relatively warm, typically moisture-containing air, the moisture would freeze on the heat exchange equipment creating a problem for continued operation. However, a refrigerant can be selected and varied by volume and heat capacity to diminish the temperature that the air is exposed to in the performance of the rewarming function despite any potential temperature differential between the air and the depressurized natural gas. More importantly, the refrigerant is utilized in a manner so that it undergoes a phase change from vapor to liquid when exchanging with the rewarming depressurized natural gas. Therefore, the significant amount of heat being transferred is not reflected in sizeable temperature changes, but is reflected in the transfer of the heat of condensation of the refrigerant. As a result refrigerant volume, heat capacity and phase change operate to diminish or eliminate the problem of frosting which would occur with direct heat exchange of the low temperature gas with ambient atmosphere or air.

The pressure of the rewarm cycle is set by the pressure in the pump reservoir 56 which in turn is set by ambient atmosphere conditions. Two methods can be utilized to set these conditions in accordance with ambient temperatures. In the first approach, the pressure in reservoir 56 can be fixed at that pressure corresponding to the lowest ambient temperature expected. Therefore regardless of higher ambients, the pump reservoir pressure will be fixed. This constitutes a low equipment cost method which is less efficient then a system designed to fluctuate with ambient conditions. Another approach to the operation of the rewarming cycle is to set the pressure in the pump reservoir 56 at varied pressure levels depending upon prevailing average ambient temperature. At lower ambient temperatures, the pressure will be lower to achieve the appropriate low temperature heat exchange and temperature driving force across the heat exchangers of the air exchange bays. At high ambient temperatures the pressure will be higher due to the higher temperature level driving force at the air exchange bays. This latter method of operation of the rewarming cycle is more energy efficient in operation, but requires greater capital due to the necessary controls for varying pressure conditions responsive to average ambient conditions. Such operation constitutes a trade-off between maximum operation efficiency and least capital cost. Neither mode of operation drastically effects the energy effective characteristics of the present invention over prior art expansion and rewarming systems for high pressure gas streams.

As stated previously, under varying ambient temperature conditions the respective loads on the thermosiphon cycle and the heat pump cycle are varied. This variation is irrespective of potential pressure fluctuations which are optional in the pump reservoir 56. Under high ambient temperatures, greater flow through line 48 is allowed to the thermosiphon which performs the major rewarming duty. Under colder ambient temperatures, greater refrigerant flow through line 62 is achieved which allows for greater heat duty from the heat pump cycle. Such control is performed by valve 64 being opened or closed commensurate with the demands dictated by ambient temperature conditions.

The present invention as described above provides an energy efficient, low capital intensive method for depressurizing high pressure pipeline natural gas to low pressure, relatively warm temperature end user conditions with the recovery of net power, while performing the rewarming function with renewable energy and the power derived from expansion which meets present government guidelines. The invention has been set forth in a preferred embodiment, but it is understood that the invention may encompass other embodiments such as single stage expansion and rewarming, direct air to natural gas reheat or preheat in place of the thermosiphon if appropriate conditions prevail, or multi-stage expansion and rewarming, as well as potentially warming prior to expansion. Therefore, the scope of the invention should be ascertained by the claims which follow.

We claim:

1. A process for reduction in pressure of natural gas with the recovery of net power and the control of the temperature of the low pressure natural gas product by heat exchange with ambient atmosphere comprising the step of:
   (a) introducing high pressure natural gas at a pressure in the range of 100 to 2000 psia into an expansion turbine;
   (b) expanding the natural gas to a low pressure in the range of 40 to 100 psia and a resulting low temperature in the expansion turbine and recovering power from said turbine;
   (c) rewarming the low pressure, low temperature natural gas in at least two stages by heat exchange with an ambient atmosphere comprising:
      (1) indirect heat exchange of said natural gas with a refrigerant in a thermosiphon cycle which indirectly heat exchanges with said ambient atmosphere;
      (2) indirect heat exchange of the natural gas of substep (1) with a refrigerant in a heat pump cycle which indirectly heat exchanges with said ambient atmosphere;
   (d) recovering the natural gas at a low pressure and at a relatively warm temperature of at least 35° F.

2. The process of claim 1 wherein the natural gas emanating from the heat exchange with the heat pump refrigerant of step (c) substep (2) is further expanded to a low pressure and temperature in an expansion turbine and further rewarmed in at least two stages by heat exchange with an ambient atmosphere by indirect heat exchange with the refrigerant of a thermosiphon and then indirect heat exchange with the refrigerant of a heat pump to produce natural gas at low pressure and relatively warm temperature.

3. The process of claim 2 wherein the indirect heat exchanges of the natural gas are conducted with the thermosiphon and heat pump of claim 1.

4. The process of claim 1 wherein the power produced from the expansion turbine is utilized to operate the thermosiphon and heat pump cycles.

5. The process of claim 1 wherein the refrigerant of the thermosiphon is condensed to liquid in heat exchange with the natural gas and is revaporized in heat exchange with an ambient atmosphere.

6. The process of claim 1 wherein the refrigerant of the heat pump is condensed to liquid in heat exchange with the natural gas and is at least partially revaporized in heat exchange with an ambient atmosphere.

7. The process of claim 1 wherein the rewarming stages of step (c) utilize only 5-15% of the power produced in step (b).

8. The process of claim 1 wherein the rewarming stages of step (c) utilize only approximately 10% of the power produced in step (b).

9. The process of claim 1 wherein the high pressure natural gas is at a pressure of 200 to 600 psia.

10. The process of claim 1 wherein the natural gas is depressurized to 80 to 100 psia.

11. The process of claim 1 whereln the natural gas is rewarmed to a temperature in the range of 35°-45° F.

12. The process of claim 1 wherein the natural gas is rewarmed to approximately 40° F.

13. The process of claim 1 wherein the natural gas is depressurized to approximately 100 psia.

* * * * *